United States Patent [19]
Sinner

[11] 3,782,793
[45] Jan. 1, 1974

[54] BEARING CONSTRUCTION
[75] Inventor: Karl-Helmut Sinner, Dortmund-Hochsten, Germany
[73] Assignee: Hoesch Werke Aktiengesellschaft, Dortmund, Germany
[22] Filed: Jan. 24, 1973
[21] Appl. No.: 326,297

[30] Foreign Application Priority Data
Jan. 25, 1972 France............................ 7222033814

[52] U.S. Cl. ................................................ 308/160
[51] Int. Cl. ............................................... F16c 17/06
[58] Field of Search........................ 308/9, 160, 168

[56] References Cited
UNITED STATES PATENTS
3,431,034    3/1969    Saunders............................ 308/160

Primary Examiner—Manuel A. Antonakas
Assistant Examiner—Frank Susko
Attorney—Michael S. Striker

[57] ABSTRACT

A support ring is located beneath a bearing ring a major surface of which faces the support ring. The support ring is provided with one or more circumferentially spaced holes each accommodating a hydrostatic support unit for the bearing. Each support unit has a cupped element an open side of which faces the major surface and a closed side of which faces away from the major surface and is bounded by a part-spherical circular face. Beneath the cupped element is a support element a contact face of which is in mating engagement with the circular face. A cylinder is threaded into one of the holes which is tapped and has a first and a second open end which respectively face towards and away from the support element. The second open end has a flange extending thereacross. A piston is slidable in the cylinder and contacts the support element through the first open end, and communicating oil passages are formed in the flange, the piston, the support element and the cupped element in communication with the open side of the latter.

7 Claims, 3 Drawing Figures

BEARING CONSTRUCTION

BACKGROUND OF THE INVENTION

The present invention relates generally to a bearing construction, and more particularly to a bearing construction of the type having bearing rings. Still more particularly the invention relates to a bearing construction of the type having bearing rings of a diameter in excess of 2 meters, and in particular the invention relates to a bearing construction having a hydrostatic support element for the bearing ring or rings.

Bearing constructions having bearing rings which must be hydrostatically supported are required in many installations. Very often such bearing constructions must have bearing rings of very large diameter, for instance in excess of 2 meters, as in the case of large antennas or the like. The trouble is that in bearing constructions of such size the manufacturing problems involved in producing the bearings, and particularly the bearing rings are such that they preclude the necessary exactitude in the manufacture which can be obtained with smaller bearing constructions. The prior art knows for instance of bearing constructions utilizing hydrostatic support units for the bearing ring or rings in which a cupped element, the interior of which faces the bearing ring and is filled with oil under pressure, is supported by a bearing ball. However, in constructions of the type in question it is usually required that the bearing be capable of supporting between substantially 50 and 100 tons of weight in axial direction of the bearing. This in turn means that the supporting bearing balls must be relatively large, having a diameter of substantially 100 to 150 mm which in turn results in a rather significant height of such constructions. This is undesirable for various reasons known to those skilled in the art, and to this disadvantage is added the fact that it is questionable whether, should the cupped element become skew with reference to the rotating bearing ring for any reason (such as elastic deformation or other problems) the restoring moment of the cupped element is capable of overcoming the friction on the surface of the bearing ball.

All in all the constructions of this type which are available in the art are not fully satisfactory.

SUMMARY OF THE INVENTION

It is, accordingly, a general object of the present invention to provide an improved bearing construction utilizing a hydrostatic support unit for the bearing ring which avoids the disadvantages of the prior art.

More particularly the invention has as one of its important objects to provide such a bearing construction in which a metallic contact of the cupped element of the hydrostatic support unit supported by the support unit is precluded under all circumstances, even if excessive load acts upon the bearing ring, if the pressure of oil decreases or disappears or if elastic deformations of the bearing ring should take place.

In keeping with these objects, and with other objects which will become apparent hereafter, one feature of the invention resides in a bearing construction, particularly a construction with a bearing-ring diameter in excess of 2 meters in a combination which briefly stated comprises a support ring having an upper side and provided with at least one tapped hole and a bearing ring above the support ring and having a major surface facing the upper side and overlying the hole. A hydrostatic support unit for the bearing unit is provided and comprises a cupped element having an open side facing the major surface and a closed side facing away from the major surface and bounded by a part-spherical circular face. A support element is provided at the closed side and has a contact face in mating surface-to-surface engagement with the circular face. A cylinder is threaded into the tapped hole and has a first and a second open end which respectively face towards and away from the support element. A flange extends across the second open end and a piston is slidable in the cylinder and contacts the support element through the first open end. Communicating oil passages are provided in the flange, piston, support element and cupped element and are in communication with the open side of the latter.

Screwthreads in the cylinder and on the tapped bore are advantageously in form of a fine thread which preferably has a pitch of 1 mm. It is the purpose of this to make possible a very precise height adjustment of the hydrostatic support unit with reference to the bearing ring which it is to support. This is further facilitated by providing the outer circumferential surface of the cylinder in which the fine thread thereof is provided, with ten axial grooves which are equiangularly spaced about the cylinder, and providing the inner circumferential surface bounding the tapped hole with ten similarly dimensioned axial grooves which are located over a portion of the inner circumferential surface which corresponds to nine-tenths of the distance between two adjacent ones of the grooves in the surface of the cylinder. The arrangement of the grooves permits a fine adjustment analogous to a Nonius construction. In addition, it is advantageous to provide expansion springs located within the cylinder and acting upon the piston in requisite manner which will be described in further detail.

The novel features which are considered as characteristic for the invention are set forth in particular in the appended claims. The invention itself, however, both as to its construction and its method of operation, together with additional objects and advantages thereof, will best be understood from the following description of specific embodiments when read in connection with the accompanying drawing.

DESCRIPTION OF THE PREFERRED EMBODIMENTS

Figure 1:
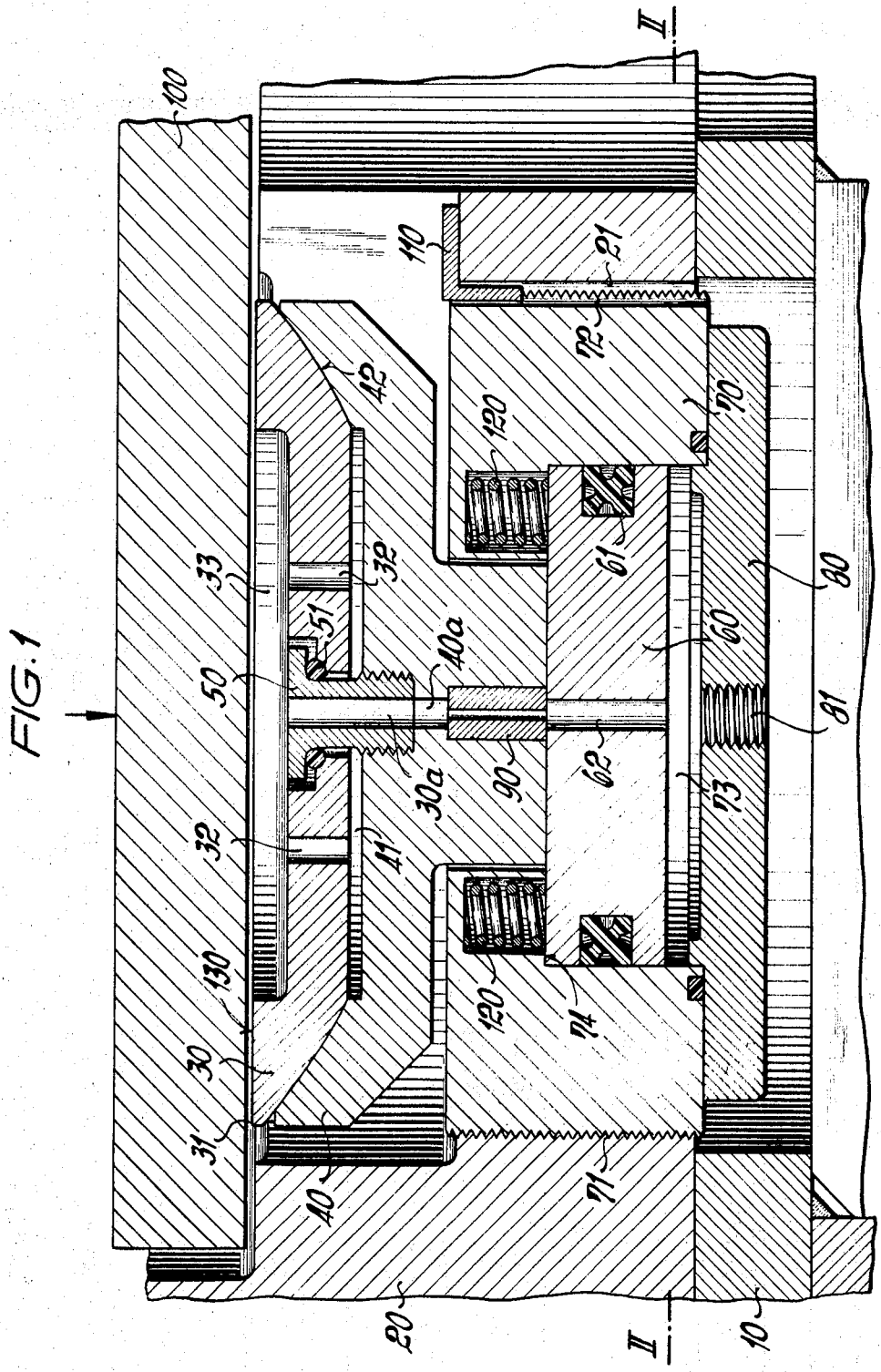
FIG. 1 is a fragmentary section showing a hydrostatic support unit according to the present invention with portions of a support ring and a bearing ring with which it cooperates.
Figure 2:
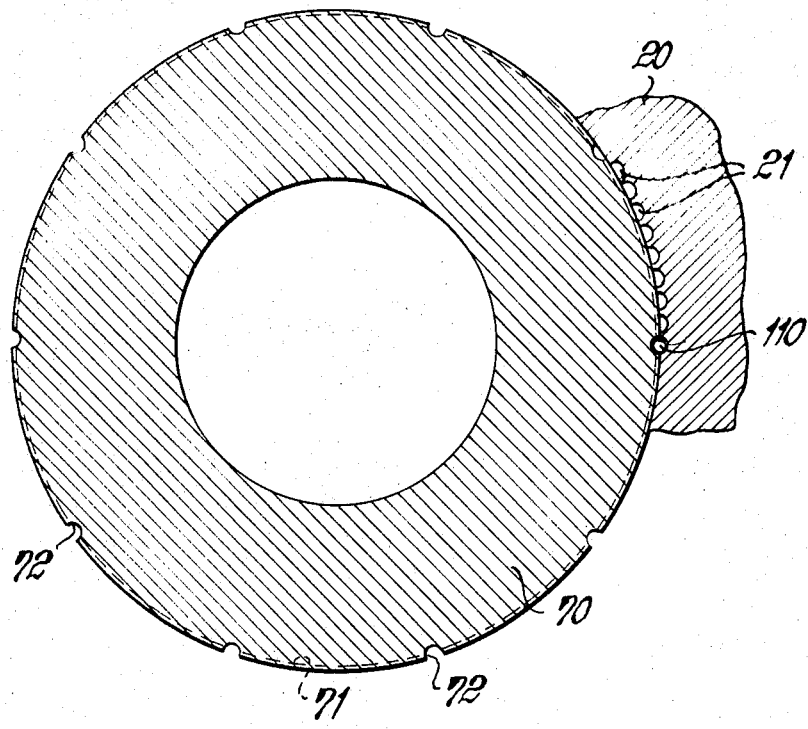
FIG. 2 is a horizontal section through the support ring and a component of the hydrostatic support unit of FIG. 2.
Figure 3:
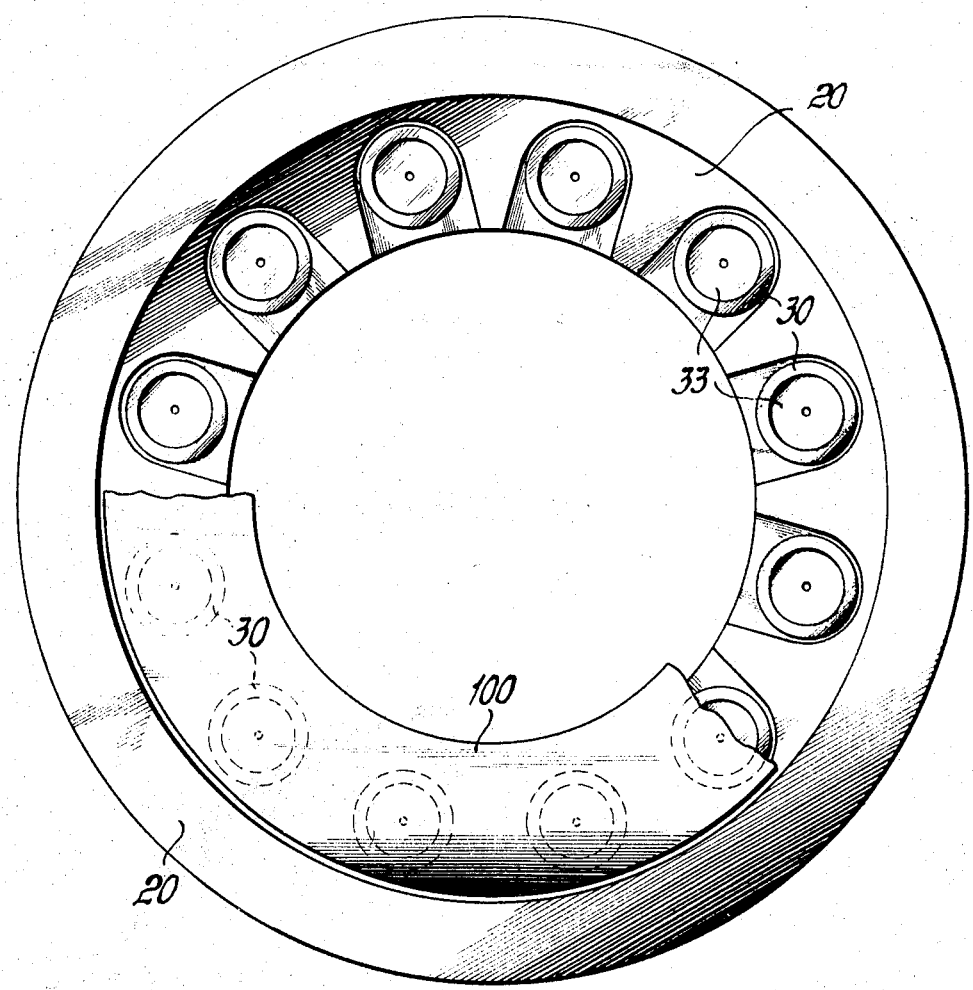
FIG. 3 is a diagrammatic top-plan view of the bearing construction which is fragmentarily shown in FIG. 1.

Discussing the drawing in detail which illustrates in FIGS. 1–3 one embodiment of the invention, it will be seen that reference numeral 10 identifies an appropriate base or support on which there is supported a support ring 20 provided with a pluraltiy of circumferentially spaced tapped holes (one shown but not separately identified with a reference numeral) into which respective hydrostatic support units according to the invention can be threaded as a unit, and from which they can be similarly removed. Located above the support ring 20 is a bearing ring 100 of the bearing construction, so that its outer circumferential margin partially overlaps the support ring as shown at the left-hand side of FIG. 20. A major surface of the bearing ring 100 faces downwardly, that is towards the support ring 20 as shown in FIG. 1.

Each of the hydrostatic support units according to the present invention, which are to support the bearing ring 100 on the support ring 20, utilizes a cupped element 30 the open side of which faces the underside of the bearing ring 100 and defines therewith a space 33 for accommodation of oil under pressure. The closed side of the element 30, that is the side facing away from the bearing ring 100, is provided with a part-spherical circular face 42, and the latter is engaged in surface-to-surface contact by a matingly configurated contact face of a support element 40. The elements 30 and 40 are connected with one another by a threaded connection 50 which will be discussed later. A portion of the element 40 extends into a cylinder 70 which is threaded into the associated tapped hole of the support ring 20 and which accommodates in its interior a piston 60. The lower end of the cylinder 70, that is the end facing away from the element 40, is closed by a flange or plate 80 extending transversely thereof. The outer circumferential surface of the cylinder 70 is provided with screw threads, preferably a fine thread 71 which advantageously should have a rise of 1 mm, and the cylinder 70 is thus threaded into the bore of the support ring 20 with which it is to be associated. The bore is provided with corresponding mating threads for this purpose.

A comparison of FIGS. 1 and 2 will show that the outer circumferential surface of the cylinder 70 is provided with ten axially extending equi-angularly spaced grooves 72, whereas the inner circumferential surface of the bore or hole in the support ring 20 is provided at a readily accessible location with ten identically configurated axial grooves 21 which are located over a portion of the inner circumferential surface whose circumferential distance corresponds to nine-tenths of the distance between consecutive ones of the grooves 72. This construction makes it possible, in a manner to be discussed later, to adjust the entire hydrostatic support unit with reference to the bearing ring 100 with an accuracy of one one-hundredth mm.

The elements 30 and 40 define with one another a space 41 and if a non-illustrated pressure-measuring device is accommodated in this space 41, mechanical measuring of the pressure can be omitted and automatic and continuous measuring will be obtained, it being understead that a read-out for the measuring device will be located exteriorly of the construction where it can be readily observed.

When the bearing construction is assembled and adjusted, the hydrostatic support unit is supplied with oil under pressure, and when sufficient pressure is obtained in the space 33, an arresting device 110 is used which prevents relative displacement of the cylinder 70 and the support ring 20 so that the once-adjusted position of the hydrostatic support unit with reference to the bearing ring 100 will be reliably maintained. Advantageously the pressure of oil in the space 33 will be checked once more after the bearing construction has been operated for a brief period of time, in order to be able to make compensation for settling which might have occurred.

The flange 80 is provided with an oil passage 81 through which oil under pressure is fed by means of a non-illustrated pump of requisite capacity. Entering through the passage 81 the oil enters into the interior 73 of the cylinder 70, presses against the piston 60 which is therefore pressed upwardly in FIG. 1 with a force which is proportional to its diameter. This force corresponds to the highest permissible exterior load acting upon the cupped element 30. If the load acting upon the cupped element increases, that is if a greater load is exerted upon it via the bearing ring 100 for any reason, then the constant oil pressure supplied by the pump will no longer be sufficient to maintain the piston 60 against upper abutment 74 provided for this purpose. In consequence, the element 30 will yield downwardly, thus assuring that a metallic contact of the surface 31 of the element 30 with the juxtaposed major surface of the bearing ring 100 is reliably prevented if overloading of the bearing construction should occur. Of course, this would be a highly exceptional occurrence, in which circumstances the bearing ring 100 would contact the support ring 20 where it overlaps the same, that is outwardly spaced from the surface 31 of the cupped element 30.

The cupped element 30 would also descend in FIG. 1 if the pump or pumps supplying the oil under pressure should either malfunction and supply oil at lesser pressure, or cease to operate. In this case, the cupped element 30 would again descend in FIG. 1 and in such case the expansion springs 120 which are accommodated in the cylinder 70 will have to overcome the friction of the piston 60 and of a piston seal 61 with respect to the inner circumferential surface of the cylinder 70, for which purpose they are appropriately dimensioned.

The oil which has entered via the passage 81 into the interior 73 of the piston 70 passes from there through a passage 62 provided at the center of the piston 60 into a throttling device 90 provided in an oil passage 40a of the element 40. From the throttling device 90 it passes into the unobstructed portion of the oil passage 40a and from there into the two spaces 33 and 41 via the oil passage 30a which is provided at the center of the threaded connection 50. The spaces 33 and 41 are connected with one another by passages 32 provided in the cupped element one another by passages 32 provided in the cupped element 30.

The purpose of the throttling device 90 is to reduce the pump pressure to the pressure desired to be obtained in the space 33 of the cupped element 30, and from these requirements and the pressure-reducing capabilities of the throttling device 90 the diameter of the element 30 is calculated. The oil which enters into the space 41 has a particular purpose, namely to so releave the force acting from the exterior (via the bearing ring 100) upon the surface 42 that only a small pressure contact between the surface 42 and the associated contact face of the element 40 will remain, whereby the friction between these surfaces will be correspondingly reduced. It has been found to be advantageous if the diameter of the space 41 is equal to or smaller than the diameter of the space 33; and in the present instance the diameter will be seen to be equal.

When the bearing construction is first placed into operation, it is necessary to assure that the gap 130 should develop between the upper open side of the element 30 and the juxtaposed major surface of the bearing ring 100, not between the surface 42 and the contact face of the element 40. To assure this, the element 30 is connected with the element 40 via threaded connection 50 which is threaded into an appropriately tapped recess provided for this purpose in the element 40 as shown in FIG. 1. A slight pretension is imparted to the element 30 with reference to the element 40 by having an elastically yieldable annulus 51 interposed and compressed between a head of the threaded connection 50 and the associated wall portion of the element 30 as shown. The arrangement can also serve as a holding and support component.

Due to the hydrostatic pressure relief for the surface 42, and the low friction between the same and the contact face of the element 40, the element 30 can always inherently and automatically compensate for possible angular inclinations of the bearing ring 100 with reference to it, or vice versa. If an inclination of the bearing ring 100 should occur with reference to the element 30, a restoring moment will occur due to the different pressure component acting in the gap 130 which increases at one side of the center of the element 30 and decreases at the opposite side. This means that the desired parallelism between surface 31 of the element 30 and the juxtaposed major surface of the bearing ring 100 will always be maintained, so that full load-carrying capacity of the bearing construction is assured under all circumstances.

As mentioned before, a bearing construction usually will have more than one of the hydrostatic support units of which one is shown in FIG. 1. A particular advantage of the present invention is the fact that the individual support units can be installed or removed while the bearing is actually in use so that inspection or repair can be carried out at any and all times. Furthermore, the construction according to the present invention permits a bearing construction of relatively low overall height, and due to the possibility of arranging the pressure-measuring device in the space 41 all necessity for mechanical measurements is removed and a continuous control and supervision of the pressure in the spaces 33 and 41 is possible, which in turn makes it possible to immediately compensate for possible deviations resulting for instance from settling of the bearing ring 100 or from other causes.

It will be understood that each of the elements described above, or two or more together, may also find a useful application in other types of constructions differing from the types described above.

While the invention has been illustrated and described as embodied in a bearing construction, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific features of the present invention and, therefore, such adaptations and modifications should and are intended to be comprehended within the meaning and range of equivalence of the following claims.

What is claimed as new and desired to be protected by Letters Patent is:

1. In a bearing construction, particularly a construction with a bearing-ring diameter in excess of 2 m, a combination comprising a support ring having an upper side and being provided with at least one tapped hole; a bearing ring above said support ring and having a major surface facing said upper side and overlying said hole; and a hydrostatic support unit for said bearing ring, comprising a cupped element having an open side facing said major surface and a closed side facing away from said major surface and bounded by a part-spherical circular face, a support element at said closed side and having a contact face in mating surface-to-surface engagement with said circular face, a cylinder threaded into said tapped hole and having a first and a second open end respectively facing towards and away from said support element, a flange extending across said second open end, a piston slidable in said cylinder and contacting said support element through said first open end, and communicating oil passages in said flange, piston, support element and cupped element in communication with said open side of the latter.

2. A combination as defined in claim 1, said cupped element having a center opening, a threaded connector extending through said opening and connecting said cupped element with said support element, a compressible annulus between said connector and said cupped element so that the latter is urged slightly resiliently against said support element, said oil passage of said cupped element being provided in said threaded connector.

3. A combination as defined in claim 1; and further comprising a flow-throttling device interposed in said oil passage of said support element.

4. A combination as defined in claim 1, said tapped bore and an outer circumferential surface of said cylinder having meshing fine threads.

5. A combination as defined in claim 4, wherein the pitch of said fine threads is substantially 1 mm.

6. A combination as defined in claim 4, further comprising ten equi-angularly spaced axial first grooves in said outer circumferential surface, and ten similarly dimensioned axial second grooves provided in an inner circumferential surface bounding said hole and being arranged over an angular distance which corresponds to nine-tenth of the distance between two consecutive ones of said first grooves.

7. A combination as defined in claim 1; further comprising expansion springs accommodated in said cylinder and urging said piston in one direction therein.

* * * * *

UNITED STATES PATENT OFFICE
CERTIFICATE OF CORRECTION

Patent No. 3 782 793            Dated January 1, 1974

Inventor(s) Karl Helmut Sinner

It is certified that error appears in the above-identified patent and that said Letters Patent are hereby corrected as shown below:

In the heading insert

(30) Foreign application priority date

January 25, 1972, Germany P 22 03 381.4

Signed and sealed this 18th day of February 1975.

(SEAL)
Attest:

RUTH C. MASON
Attesting Officer

C. MARSHALL DANN
Commissioner of Patents
and Trademarks